United States Patent Office 3,041,368
Patented June 26, 1962

3,041,368
PRODUCTION OF AROMATIC NITRILES
Wilton H. Lind, Walnut Creek, and John B. Wilkes, Albany, Calif., assignors to California Research Corporation, San Francisco, Calif., a corporation of Delaware
No Drawing. Filed Sept. 25, 1958, Ser. No. 763,201
4 Claims. (Cl. 260—465)

This invention relates to a process for the production of aromatic nitriles, and more particularly, to the production of aromatic nitriles by the vapor phase reaction of substituted aromatic compounds with sulfur and ammonia.

According to the present invention, the subject process comprises contacting a substituted aromatic hydrocarbon with ammonia and sulfur at an elevated temperature and in the vapor phase. The process is preferably conducted in the presence of a clay-type catalyst.

The substituted aromatic hydrocarbons suitable for conversion into nitriles by the process of the present invention are benzenes or naphthalenes substituted by at least one group represented by the formula

wherein $R_1$ and $R_2$ are each selected from the class consisting of hydrogen, a halogen, and hydroxyl, lower alkyl, and lower alkenyl groups. The latter two groups should, in general, have no more than about five carbon atoms per group. Representative examples of specific substituted aromatic hydrocarbons which may be used are toluene, ethylbenzene, mesitylene, α-chloromethyl benzene, α-hydroxymethyl benzene, α- and β-methyl naphthalene and the isomeric xylenes, diisopropyl benzenes and cymenes. The preferred aromatic hydrocarbons are the isomeric xylenes with metaxylene being especially preferred.

Although the process of the present invention can be conducted in the absence of any catalytic material, it is much preferred that the conversion of the substituted aromatic hydrocarbons to aromatic nitriles be done in the presence of a clay-type catalyst. As used herein and in the claims, the term "clay-type catalyst" refers to the art-recognized class of catalysts containing essentially silica, alumina, thoria or mixtures thereof. Included within this class of catalysts is silica gel, fuller's earth, bauxite, activated alumina, and in general, those types of clay which have been found effective in the removal of color-producing and gum-forming constituents in petroleum oils. One or more of these catalysts may be used either alone or together with magnesia and/or with one or more compounds of metals of groups V, VI, VII and VIII of the periodic table. Oxides and sulfides of the aforementioned metals are useful as catalyst promoters. As examples of metal compounds which may be used as promoters in conjunction with the silica gel, fuller's earth, activated alumina or other clay-type catalyst are the oxides or sulfides or iron, chromium, nickel, molybdenum and manganese. The most highly preferred catalyst of the present invention is activated alumina.

The reaction may be carried out over a moderately wide temperature range, for instance, between about 300° and 700° C. and preferably between about 450° and 600° C. Subatmospheric, atmospheric or superatmospheric pressures may be employed, the major requirement being that the reaction be carried out in the vapor phase. The space rate may vary over a range of from about 5 to 500 v./v./hr. (volumes of feed per volume of catalyst per hour), based upon the total volume of reactants as gases at standard temperature and pressures, depending upon the catalyst and temperature employed. Preferably, under the preferred conditions of temperature and with the preferred catalysts, the space rate will lie in the range of from about 50 to 200 v./v./hr.

The concentration of the sulfur oxidizing agent in the reaction mixture may vary within wide limits; generally it is preferred to feed to the reaction zone an amount of gaseous sulfur such that the mole ratio of sulfur to the substituted aromatic hydrocarbon lies in the range of from about 0.2 to about 10.0 and preferably in the range of from about 1.0 to 5.0.

The mole ratio of ammonia to the substituted aromatic hydrocarbon in the reactiton mixture may also vary within comparatively wide limits. Thus, it has been found that this mole ratio can vary from about 1.0 to 10.0. It is, however, preferred to use between about 1½ and 2 times the theoretical amount of ammonia for the stoichiometric reaction, i.e., about 1½ to 2 moles of ammonia per mole of hydrocarbon where a mononitrile is being formed and a proportionately higher number of moles of ammonia per mole of aromatic hydrocarbon where the desired product is a polynitrile. Lower or higher proportions of ammonia may be used if desired, but the yields obtained are generally inferior where lower proportions are used, and are not significantly increased by the use of higher proportions.

For the process of the present invention, known methods of vapor phase catalysis may be employed. The catalyst may be a stationary or moving bed, and in view of the high heat output and the necessity of observing relatively close temperature controls, a fluidized bed method may be of special advantage.

The aromatic nitriles produced in the process of the present invention may be recovered by various means, as for example, by cooling the hot gases to temperatures at which the nitriles will be deposited as liquids or solids, as the case may be, and thereafter dried.

The following examples are illustrative of the process of the present invention.

EXAMPLE 1

252 grams of 95 percent metaxylene were continuously pumped into a vaporizer, heated to a temperature of from 390 to 405° C., and thereafter passed into the bottom of a heated catalytic reactor. Simultaneously, 141 grams of ammonia (temperature from 375 to 390° C.) were continuously passed over a vessel of molten sulfur (temperature 390 to 400° C.) sweeping 108 grams of gaseous sulfur into the bottom of the reactor. The heated reactor contained a bed of about 750 ml. of 6 to 8 mesh Bayer-type alumina catalyst. The catalyst contained, in addition to the alumina, about 0.1 percent silica. The feed reaction mixture entering the bottom of the reactor had a mole ratio of metaxylene:sulfur:ammonia of 1:1.42:3.49 and a space rate, based upon the total gaseous reaction mixture, of about 150 v./v./hr. The continuous oxidation was carried out for a period of 124 minutes.

The reaction mixture passed upwardly through the catalyst bed and the following reactor temperatures were maintained:

|  | ° C. |
|---|---|
| Reactor bottom | 515–530 |
| Reactor middle | 490–530 |
| Reactor top | 520–535 |

The reaction products were passed from the reactor and scrubbed out in a cumene solvent and the latter was then fractionally distilled and analyzed. The following material balance, shown in Table 1, was obtained.

Table 1

| Product, mole percent: | Portion of xylene feed |
|---|---|
| Isophthalonitrile | 7.0 |
| Metatolunitrile | 8.1 |
| Benzonitrile | 3.1 |
| Benzene | 11.6 |
| Toluene | 2.6 |
| Xylene | 45.9 |
| Total | 78.3 |

From the results summarized in the table, it can be seen that, based upon the actually recovered products (about 80%), a conversion to compounds other than metaxylene of about 41.5 percent (32.4 mole percent of a total of 78.3 percent recovered) resulted of which about 56 percent were the desired aromatic nitriles.

EXAMPLE 2

Employing essentially the same method and equipment described in Example 1 above, 2.14 moles of toluene, 0.69 mole of sulfur, and 8.0 moles of ammonia were continuously contacted in the vapor phase with the same catalyst employed in Example 1. The mole ratio of toluene:sulfur:ammonia entering the bottom of the reactor was 1:0.32:3.74. The reaction was conducted at a temperature of about 570° C. The reactants were passed through the reactor at a space rate of about 150 v./v./hr. and the run was continued for about 120 minutes. A total recovery of 32 percent of the reaction products was made, of which 29.7 percent (0.203 mole) was benzonitrile.

We claim:

1. The vapor phase process for the production of aromatic nitriles which comprises introducing vaporized ammonia and sulfur into a reaction zone maintained at 450–600° C. into contact with a vaporized aromatic hydrocarbon selected from the group consisting of substituted benzene and substituted naphthalene, containing as sole substituents not more than three alkyl groups of the formula:

wherein $R_1$ and $R_2$ are each selected from the class consisting of hydrogen and methyl, said contacting being conducted at a mol ratio of ammonia of from 1 to 10 and of sulfur of from 0.2 to 10 per mol of said hydrocarbon, and at a space rate of from 5 to 500 v./v./hr. and in the presence of an oxide catalyst selected from the group consisting of the oxides of aluminum, silicon, and thorium, and thereafter recovering a reaction product mixture containing the corresponding aromatic nitrile.

2. The process of claim 1 wherein the catalyst is activated alumina.

3. The process of claim 1 wherein the catalyst is promoted with at least one metal selected from the metals of groups V, VI, VII, and VIII of the periodic table.

4. The process of claim 1 wherein the aromatic hydrocarbon is m-xylene.

References Cited in the file of this patent

UNITED STATES PATENTS

| 2,499,055 | Cosby et al. | Feb. 28, 1950 |
| 2,783,266 | Toland | Feb. 26, 1957 |
| 2,845,449 | Toland | July 29, 1958 |